(12) United States Patent
Coleman et al.

(10) Patent No.: US 6,262,732 B1
(45) Date of Patent: Jul. 17, 2001

(54) METHOD AND APPARATUS FOR MANAGING AND NAVIGATING WITHIN STACKS OF DOCUMENT PAGES

(75) Inventors: Denis Raymond Coleman, Atherton, CA (US); Lev Belov, Redmond, WA (US); Todd Farrell Basche, Los Altos, CA (US); Pierre-Alain Cotte, Paris (FR)

(73) Assignee: ScanSoft, Inc., Peabody, MA (US)

( * ) Notice: Subject to any disclaimer, the term of this patent is extended or adjusted under 35 U.S.C. 154(b) by 0 days.

(21) Appl. No.: 08/217,392

(22) Filed: Mar. 24, 1994

Related U.S. Application Data

(63) Continuation-in-part of application No. 08/143,212, filed on Oct. 25, 1993, now abandoned.

(51) Int. Cl.[7] .................................................. G06F 15/00
(52) U.S. Cl. .......................................... 345/348; 345/351
(58) Field of Search ..................................... 345/156, 145, 345/173, 119, 157; 395/158, 159; 364/578, 518

(56) References Cited

U.S. PATENT DOCUMENTS

| | | | |
|---|---|---|---|
| 4,860,217 | * | 8/1989 | Sasaki et al. ........................ 364/518 |
| 5,053,763 | * | 10/1991 | Sarra . |
| 5,060,135 | | 10/1991 | Levine et al. . |
| 5,063,600 | * | 11/1991 | Norwood . |
| 5,161,213 | | 11/1992 | Knowlton . |
| 5,237,651 | * | 8/1993 | Randall ................................ 395/157 |
| 5,333,255 | * | 7/1994 | Damouth ............................. 395/157 |
| 5,499,330 | | 3/1996 | Lucas et al. ......................... 335/776 |

OTHER PUBLICATIONS

Eight–in–One, Spinnaker, 1989, pp 43–44.*
Microsoft Access User's Guide, 1992, pp. 351–352 ("Moving Between Fields and Records").
JakobNielsen, "Hypertext and Hypemedia", 1990 Academic Press, Inc., New York, pp 127–140.*
Jakob Nielsen, "Hypertext and Hypermedia", 1990, Academic Press, Inc., New York, pp 1–3 and 15–27.*

* cited by examiner

*Primary Examiner*—Amare Mengistu
(74) *Attorney, Agent, or Firm*—Gallagher & Lathrop; David N. Lathrop

(57) ABSTRACT

An apparatus and method for an information processing system are disclosed for improved manipulation of documents consisting of multiple pages. In one embodiment, a multi-page document is depicted by a representation of a stack of pages and a request area through which an operator may navigate within the stack. In another embodiment, a multi-page document is depicted by static icon representing the stack and a dynamic miniature replica of a current page within the stack. Additional functions are disclosed such as adding one or more pages to a document, removing a page from a stack, rotating a page within a stack, and adding annotations to a page.

9 Claims, 7 Drawing Sheets

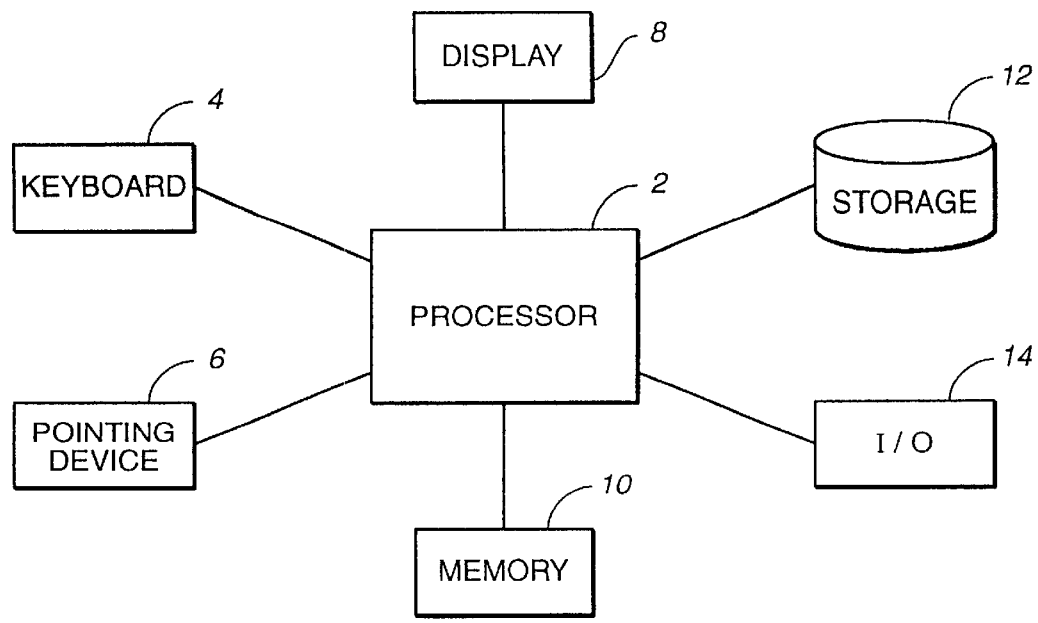
FIG._1
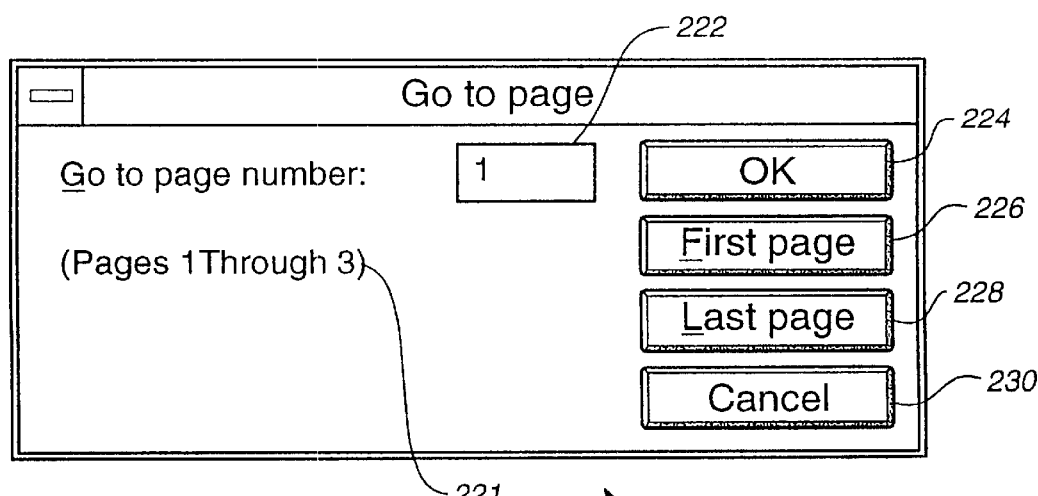
FIG._4

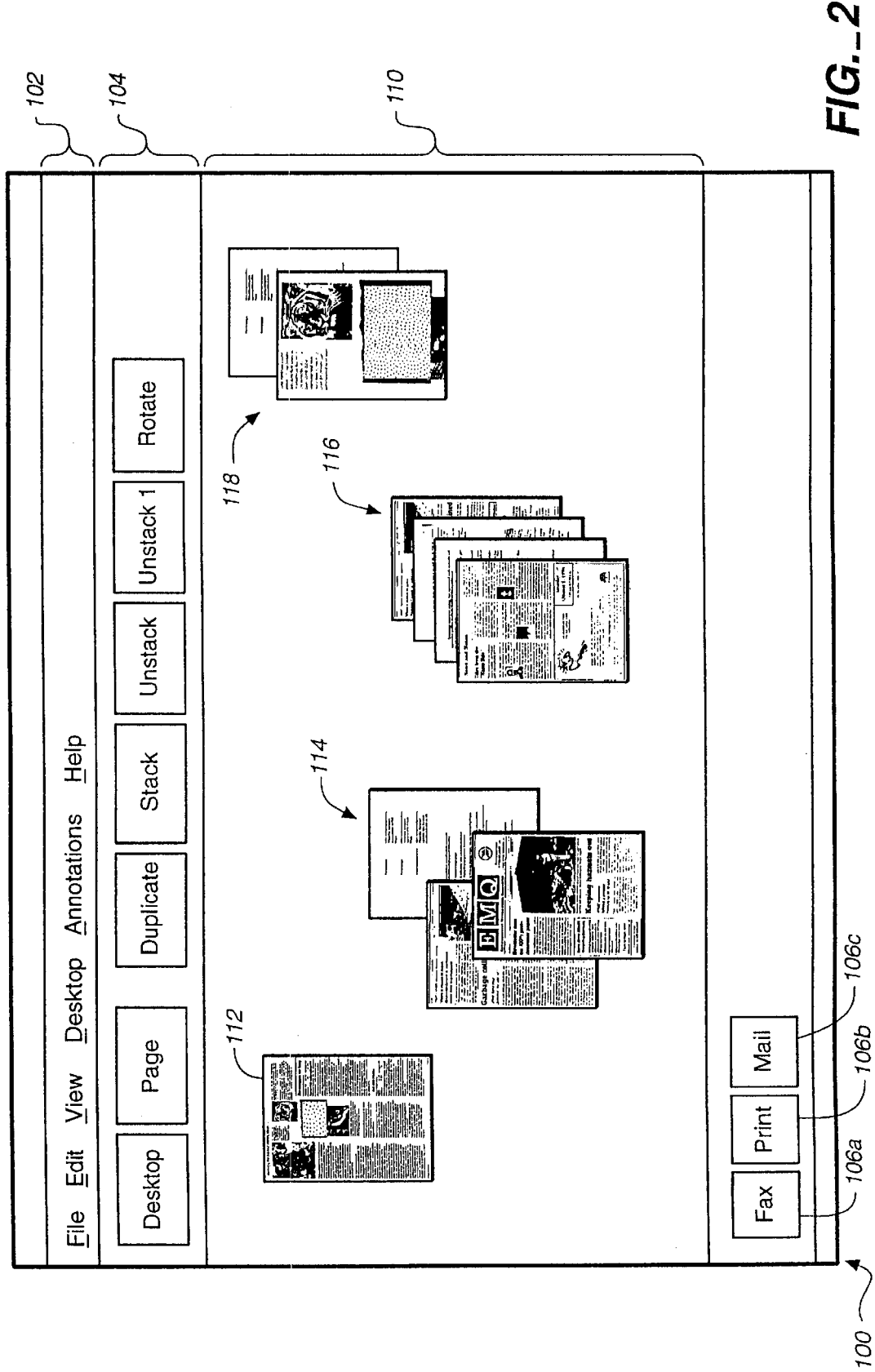
FIG._2

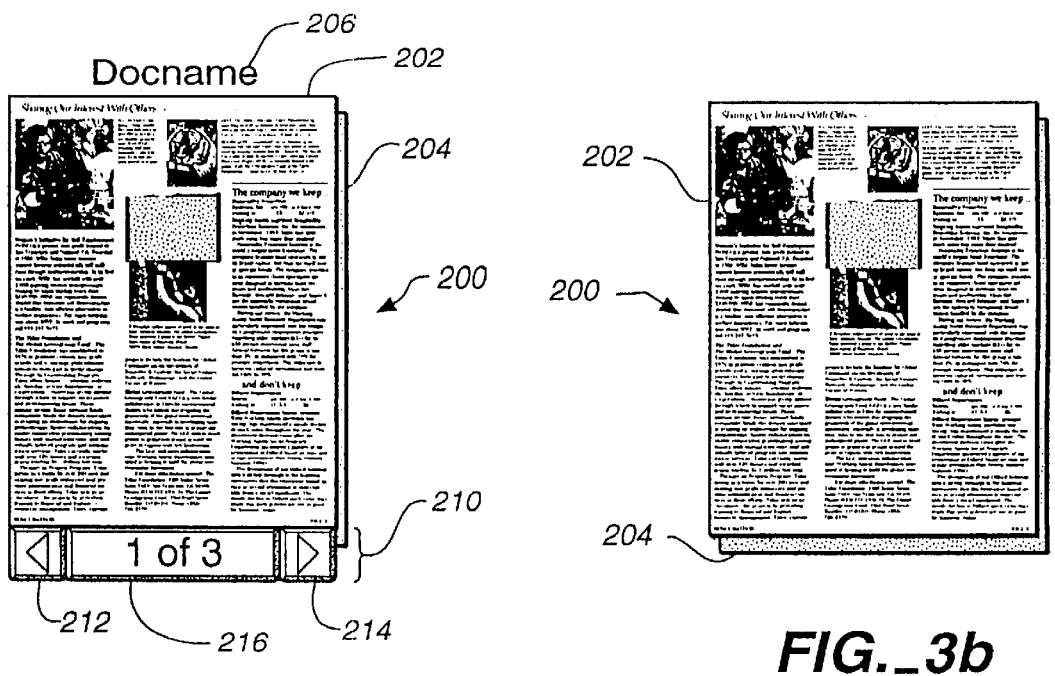
FIG._3a
FIG._3b
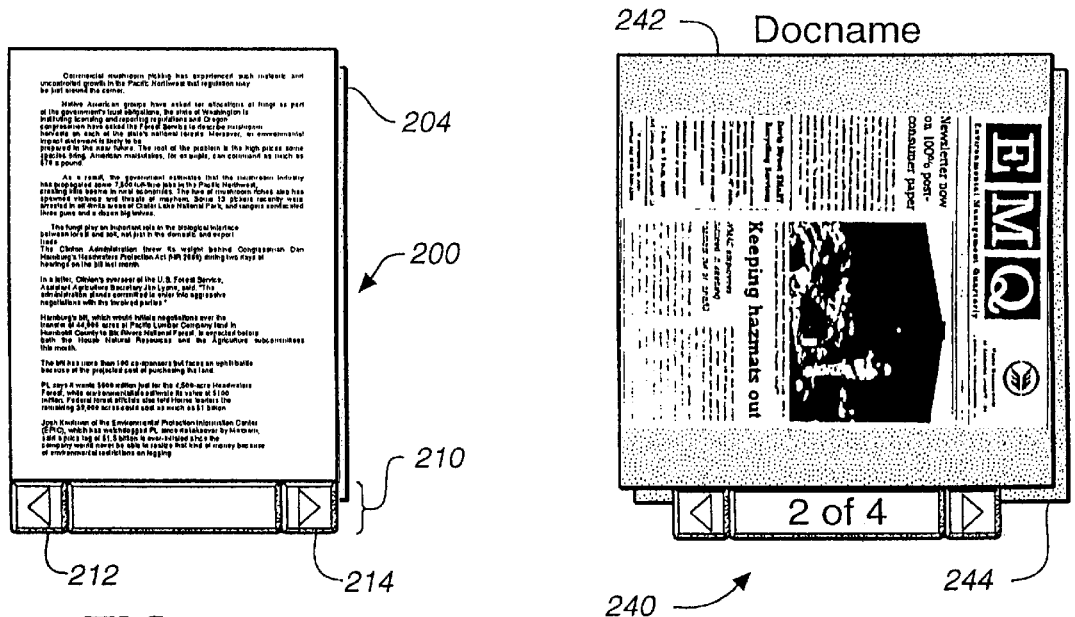
FIG._3c
FIG._6

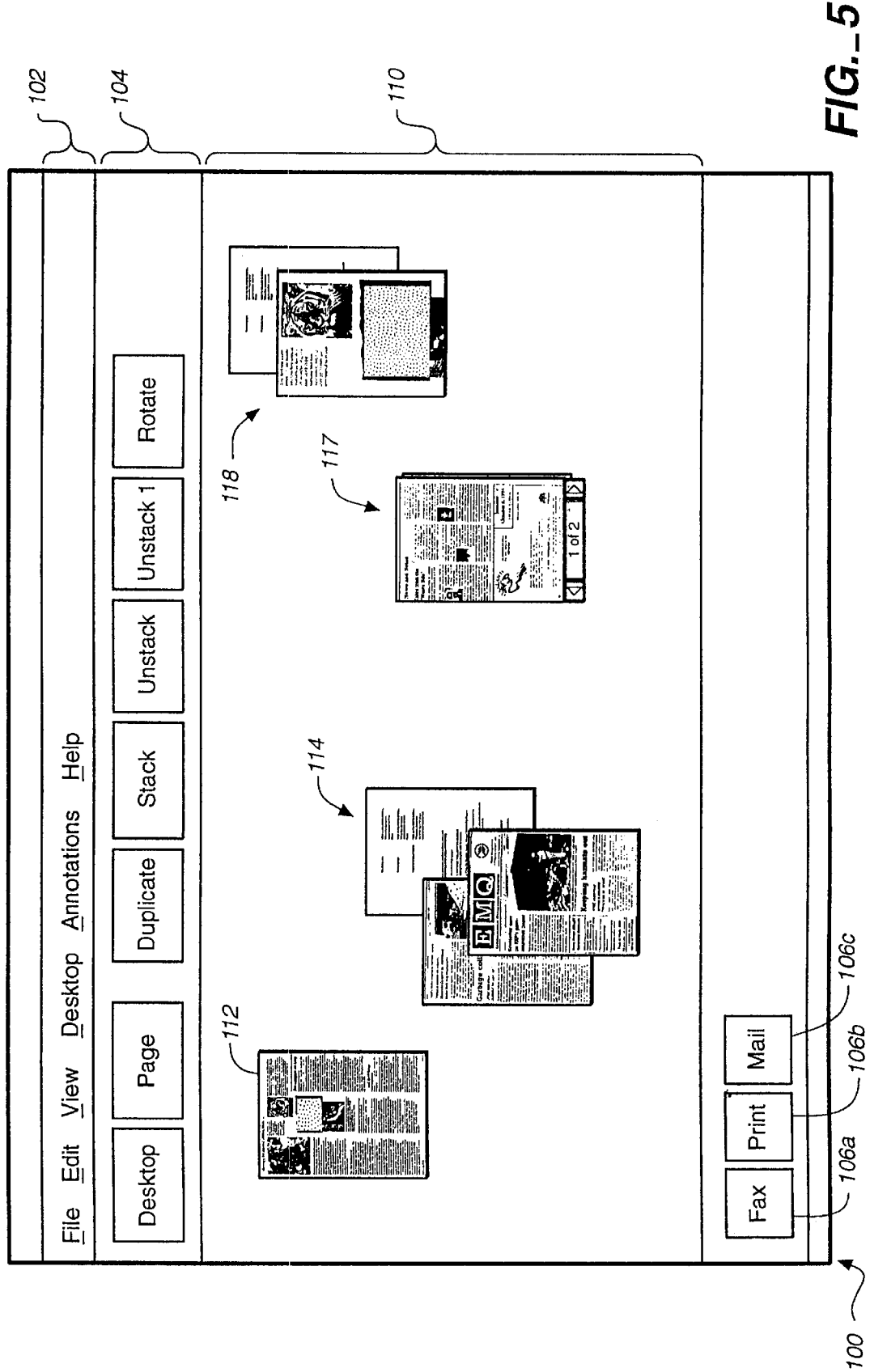
FIG._5

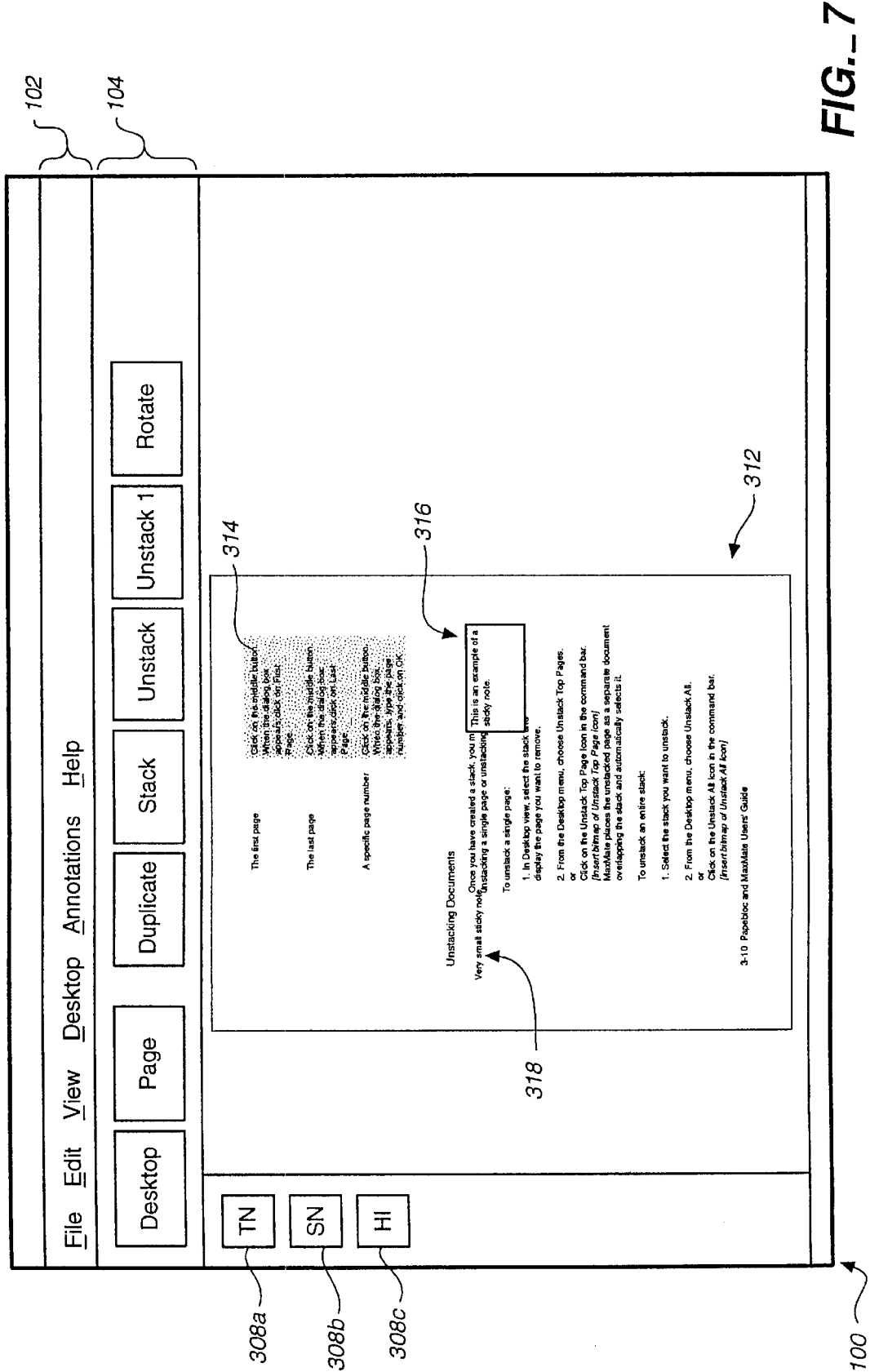
FIG._7

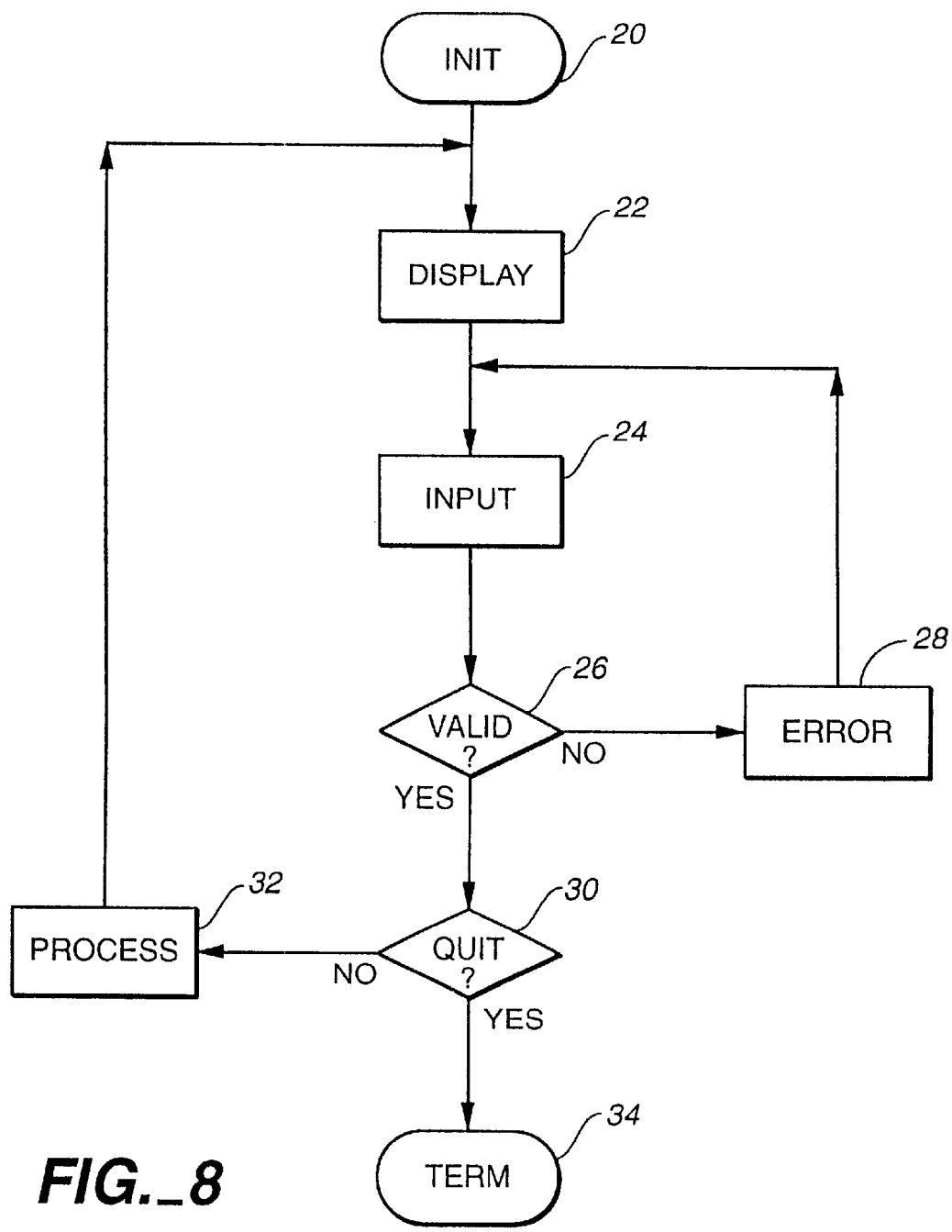
FIG._8

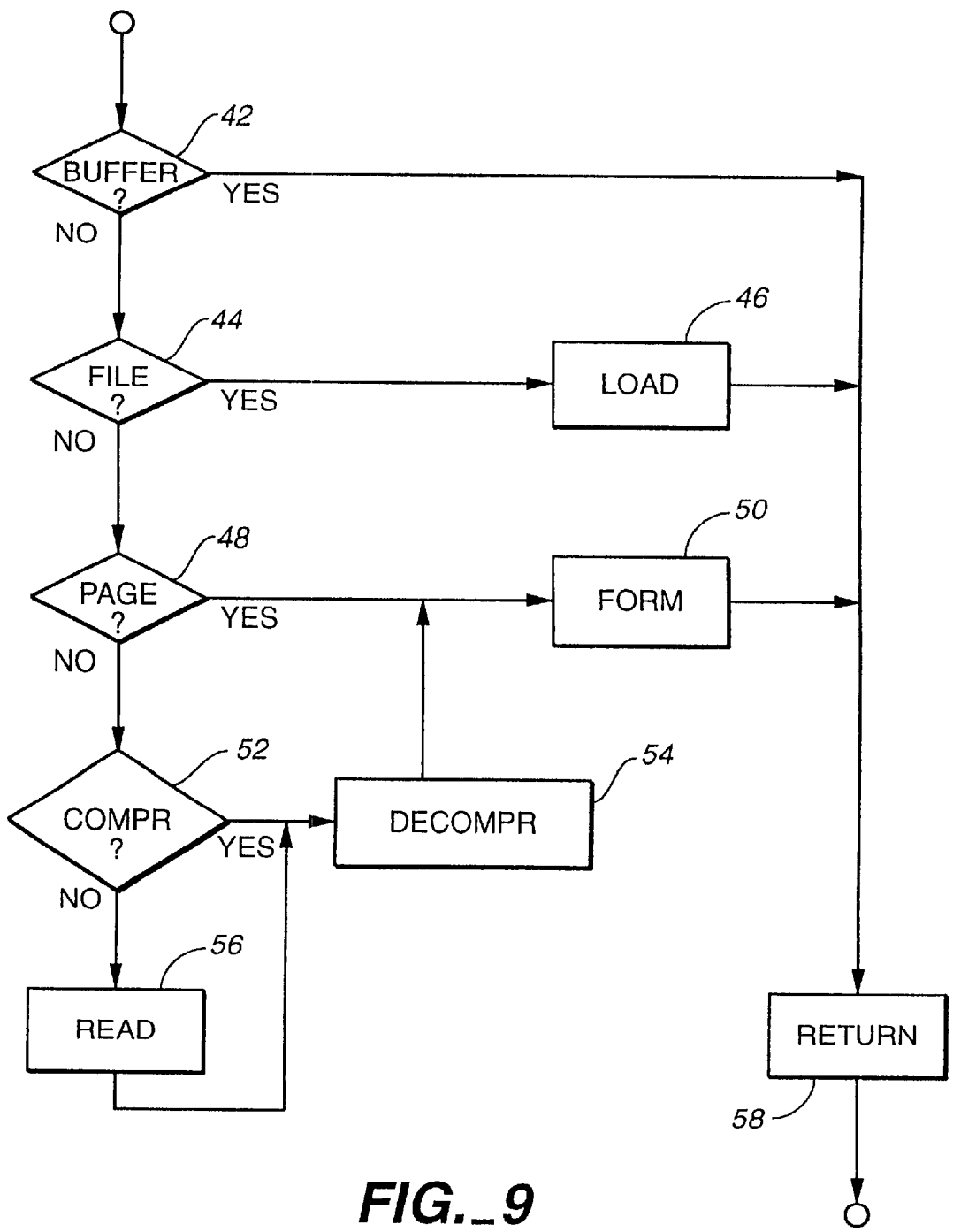
FIG._9

METHOD AND APPARATUS FOR MANAGING AND NAVIGATING WITHIN STACKS OF DOCUMENT PAGES

CROSS-REFERENCE TO RELATED APPLICATION

This application is a continuation-in-part of copending application Ser. No. 08/143,212 filed Oct. 25, 1993 abandoned.

TECHNICAL FIELD

The present invention relates in general to the manipulation of documents in an information processing system, and relates more particularly to a user interface for managing one or more document pages arranged in stacks and for navigating within the stacks of document pages.

BACKGROUND ART

There is considerable interest among those in the field of information processing to simplify the operation of processing systems used to manage information. Operational requirements have been simplified by the development of "interfaces" between a processing system and an operator which are easy to use. One well known type of system-operator interface is a so-called "graphical user interface" or GUI which displays a representation of a desktop and various objects on the desktop such as pages of documents and desk accessories. The representation of pages represent information and the representation of desk accessories represent functions provided by the processing system which may be used to manage the information.

The term graphical user interface or GUI lacks a precise formal definition, but it is generally understood to refer to a system-operator interface which utilizes graphical capabilities of system displays. Examples of such GUIs are provided by software offered under the trademarks "Windows," "OS/2 Presentation Manager," "OSF/Motif" and "Macintosh Finder."

In contrast to these graphics-mode interfaces, some so-called text-mode interfaces offer many of the benefits of true GUIs. One example of such a text-mode interface is provided by software offered under the trademark "DESQview."

The term GUI as used herein refers to both graphics-mode and text-mode interfaces. It will be apparent to those of ordinary skill in the art that some of the features described below are better implemented using graphics-mode interfaces; however, text-mode interfaces can closely simulate the appearance of true GUIs by using geometric-shaped characters. The emphasis herein is upon the way in which an operator may interact with an information processing system rather than upon details of technology implementing the interface.

The representation of desk accessories such as facsimile machines, in/out boxes and trash cans are typically static images or "icons" which resemble corresponding real-life tangible objects. The icons represent system processes which perform functions similar to the functions performed by the tangible objects suggested by the icons. For example, an icon suggesting a facsimile machine represents a system process which sends and/or receives a "fax" and an icon suggesting a trash can represents a system process for discarding or deleting information.

Pages of documents, which correspond to stored information, may be represented by icons or they may be represented by dynamic images which are miniature replicas of the information as it would appear on a printed page. The term "document" is used herein to refer to a wide variety of stored information which may be displayed or represented on printed pages. Miniature replicas of document pages may represent text and/or graphical information printed by suitable processing software.

The use of miniature replicas to represent pages of information is often preferred even though more processing resources are required to generate and display the replicas. Such use is preferred because it can simplify the task of identifying a document. The miniature replicas provide a direct means for identifying the contents of a document as opposed to indirect means such as a static icon with a name or short title associated with the document. Documents containing multiple pages can be represented by a plurality of miniature replicas, one replica for each page.

An "Apparatus for Manipulating Documents in a Data Processing System Utilizing Reduced Images of Sets of Information which are Movable" is disclosed in U.S. Pat. No. 5,060,135, which is incorporated herein by reference in its entirety. The disclosure describes forming miniature replicas, referred to therein as "stamps," and also describes arranging stamps into stacks. The representation of each page in an aligned stack is offset slightly both vertically and horizontally in a manner suggesting a stack of pages. The disclosure describes a GUI in which stacks may be managed as an entity; for example, the contents of all of the pages in a stack may be electronically mailed. The disclosure also describes a few functions which may be performed with the top page in the stack such as removing the page from the stack or adding an annotation to the page.

A GUI can simplify the operations required to manage information in a processing system by allowing an operator to interact with representations in a way which emulates familiar activities with tangible objects. For example, the operator may transmit a document facsimile by using the GUI to move a representation of the document to a facsimile machine icon. The operator may accomplish these interactions using a keyboard and/or a "pointing device" such as a mouse, a trackball, a joystick, a light pen, or a stylus with an electronic tablet. A display screen provides visual feedback to the operator. Generally, the operator may use a pointing device and/or a keyboard to move a visible marker or "cursor" within the area shown by the screen, and the pointing device and/or the keyboard may be used to enter information or to make certain selections.

Despite the improvements offered by interfaces such as a GUI, the manipulation of multi-page documents is hindered by the lack of a way to easily move or navigate within a stack of pages and to perform functions with any given page within a stack.

DISCLOSURE OF INVENTION

It is an object of the present invention to provide for a system-operator interface which simplifies the operations required to manage a stack of pages and to allow system processes to perform functions with any page within a stack.

It is another object of the present invention to provide for a system-operator interface which simplifies moving or navigating within a stack of pages.

It is yet another object of the present invention to provide for a system-operator interface which requires fewer processing resources to display a representation of a stack of pages.

These objects and other objects which are discussed throughout this description are achieved by the invention as claimed.

In accordance with the teachings of one aspect of the present invention, a processing system displays a representation of a stack of pages having an image of a "current page" and having a navigation area by which an operator may specify any page in the stack to be the current page. In preferred embodiments, the current page is represented by a miniature replica of a printed representation of that page. By providing a navigation area by which an operator may easily specify any page within the stack, the operations required to navigate within the stack are simplified.

In one embodiment, an operator is provided with a navigation area comprising a plurality of indicators by which a new current page may be specified. These indicators refer to the first page in the stack, the last page in the stack, the page preceding the current page and the page following the current page. In yet another embodiment, an operator may specify any page by its location within the stack. For example, an operator may specify the fifth page to be the current page.

In accordance with the teachings of another aspect of the present invention, a processing system displays a representation of a stack of pages in which the stack is depicted by a static icon and a current page within the stack is represented by a miniature replica of a printed representation of that page. In preferred embodiments, the replica of the current page is arranged such that it appears to lie on top of the stack. By depicting the stack with a static icon, fewer processing resources are required than would be needed to depict each page in the stack, and particularly to depict each page with a dynamic image or replica.

In accordance with the teachings of yet another aspect of the present invention, a processing system provides functions by which an operator may (1) assemble individual pages into a stack, (2) insert one or more individual pages into an existing stack at a specified location, (3) insert the pages within a first stack into a second stack at a specified location, (4) remove a selected page from a stack, (5) add notations to a selected page, (6) rotate the image and modify the corresponding information in a selected page such that a printed representation of the information will also be rotated, and (7) extract information corresponding to a selected page. In a preferred embodiment, the representation of the stack is adjusted to reflect the maximum dimensions of the pages within the stack.

For ease of discussion, much of the following discussion will assume an interface implemented as a GUI displaying a desktop, but it should be understood that aspects of the present invention may be incorporated into other implementations. More particular mention will be made of operations using a mouse. For example, the term "clicking on" an object is usually understood to refer to operator actions with a mouse to identify and select the object. These actions often comprise moving a cursor with the mouse until it overlaps the desired object and briefly pressing or "clicking" a button on the mouse to select the object. As used herein, however, terms usually associated with mouse usage will refer generally to operator actions to perform similar functions using any device such as another type of pointing device or a keyboard. For example, an embodiment of an interface may allow an operator to "click on" an object using a keyboard according to a procedure such as pressing a "tab" key to highlight successive objects on the screen until the desired object is highlighted, and then pressing an "enter" or "return" key to select the highlighted object. Similarly, an embodiment may allow an operator to move a cursor by pressing keys with up/down and right/left arrows, and performing a click by pressing the "enter" key. Many variations are possible.

As another example, an operation known as "drag and drop" may be performed with a mouse by moving a cursor to a desired object, pressing and holding down a button on the mouse to select the object, "dragging" the object across the desktop by holding the button down while moving the cursor, and "dropping" the object at a desired location by releasing the button. An embodiment of an interface may allow an operator to drag and drop an object with a keyboard using a procedure such as pressing a "tab" key to highlight an object, holding down a "control" key while pressing an "enter" key to select the object and while pressing keys with up/down and right/left arrows to move the selected object across the desktop to a desired location, and pressing the "enter" key after releasing the "control" key to drop the selected object.

A mouse may also be used to initiate system processes or to select options. This may be accomplished by clicking on a menu item or on a simulated button corresponding to the system process, or by clicking on a symbol corresponding to the option. An embodiment may also respond to a keyboard, particularly if each menu item, button and/or option is uniquely identified by a letter or number. For example, a menu item "select All" with the letter "A" highlighted may represent a system process which selects all objects on the desktop. By clicking on the text in the menu, all objects on the desktop are selected. The highlighting of the letter "A" is a reminder that the system process may also be initiated by pressing the "A" key on a keyboard while the menu is displayed.

These activities may be supported using other devices and other operational steps. These examples show that a variety of embodiments are possible. Although some operational efficiencies may be achieved by using certain devices and certain operations as opposed to others, the precise manner in which operations are carried out is not critical to the practice of the present invention.

A more detailed description of several GUIs may be obtained by referring to "Microsoft Windows User's Guide, Operating System Version 3.1," 1993, Microsoft Corp., "Macintosh User's Guide for Desktop Macintosh Computers, 1992, Apple Computer, Inc., and "GEOS System Software Overview," 2nd ed., 1993, Geoworks Inc., all of which are incorporated by reference in their entirety.

Other features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

BRIEF DESCRIPTION OF DRAWINGS

FIG. 1 is a schematic representation of an information processing system.

FIG. 2 is a schematic illustration of a processing system screen display comprising a desktop with representations of documents and system processes.

FIGS. 3a–3c are hypothetical representations of a document stack according to various aspects of the present invention.

FIG. 4 is a schematic illustration of a dialog box by which an operator may specify a new current page.

FIG. 5 is a schematic illustration of a processing system screen display comprising a desktop with a representation of a stack according to one aspect of the present invention.

FIG. 6 is a hypothetical representation of a document stack with a rotated image for the current page according to one aspect of the present invention.

FIG. 7 is a schematic representation of a processing system screen display with an enlarged representation of a page image with annotations.

FIG. 8 is a flow diagram illustrating one example of logic flow in an interactive system which may incorporate various aspects of the present invention.

FIG. 9 is a flow diagram illustrating one example of a process to manage miniature replicas.

MODES FOR CARRYING OUT THE INVENTION

A. Processing System

FIG. 1 illustrates schematically a typical information processing system suitable for incorporating various aspects of the present invention. Other types and combinations of equipment are possible. The structure or architecture of the system is not critical to the practice of the present invention.

Referring to the figure, processor 2 receives operator requests from keyboard 4 and/or from pointing device 6, performs a number of functions to service the requests, and provides visual feed back to the operator using display 8. Memory 10, which is typically a random access memory, provides temporary storage for processor 2; storage 12, which may use magnetic or optical storage techniques for example, provides long-term storage. I/O 14 represents various input/output peripherals such as modems, scanners, printers and networks.

Many variations are possible. For example, long-term storage may be provided elsewhere such as by a network server and other devices may be used to provide feedback to an operator such as sound generating devices. The screen may be a graphical device or a text device. No particular pointing device is required but a mouse is preferred. Devices such as so-called "touch screens" may be used as both a display screen and a pointing device. Processor 2 may be implemented with a single-chip microcomputer, a microprocessor, a large-scale main frame computer, special-purpose hardware or any other apparatus or method capable of preforming the functions needed to service operator requests.

The following discussion first describes various ways in which an operator may interact with a system-operator interface. The description is directed toward various features of an interface that convey information to an operator and receive information from an operator, and is directed toward operator actions which may be used to achieve desired results. Following the discussion of the interface description, some details of implementation are disclosed.

B. Desktop

FIG. 2 is a schematic illustration of a graphical user interface (GUI) display known in the art which comprises menu 102, "button bar" 104 in which designated portions or "buttons" correspond to system processes, icons 106a–106c representing system processes and desktop 110. These features of the GUI are well known in the art and their use is not critical to the practice of the present invention. The three icons 106a–106c represent system processes of sending/receiving document facsimiles, printing documents, and sending/receiving documents by electronic mail, respectively. In many embodiments, the icons suggest tangible objects which perform functions similar to the corresponding system process. For example, a representation of an in/out box or a mail box can be used in an icon representing a system process for electronic mail.

On desktop 110 appear representations of an individual page 112, an unaligned set of overlapping pages 114, a set of pages assembled into a stack 116, and an aligned set of overlapping pages 118.

The set of pages assembled into stack 116 differ from other pages on the desktop in that they may be manipulated as a single entity. For example, the entire stack may be selected by clicking on any page in stack 116. By contrast, clicking on any one page in overlapping pages 118 will result in the selection of only that page.

The representation of stack 116 has several deficiencies: (1) even though stack 116 and pages 118 are treated very differently, there is little or no visible distinction between the two sets of pages; (2) the representation of stack 116 becomes unwieldy as the number of pages in the stack becomes large because a portion of each page is represented; and (3) no facility is provided to easily navigate among the pages in the stack.

In the particular embodiment illustrated in FIG. 2, the information corresponding to each page image is represented by a miniature replica of the information as it would appear on a printed page. Although considerable processing resources are required, the use of replicas is preferred in many embodiments because it assists an operator in identifying documents. Unfortunately, because each page is represented by a replica, the processing resources required to display the representation of stack 116 increases as the number of pages in the stack increases.

C. Stack Representation

FIG. 3a illustrates one embodiment of a representation of a document stack according to one aspect of the present invention. The representation 200 comprises miniature replica 202 of only a current page, static icon 204 indicating that the object represents a stack, title 206 which provides additional identification of the document, and navigation bar 210 which displays the position of the current page in the stack and which may be used to control stack navigation. In the hypothetical example shown in FIG. 3a, area 216 indicates that the first of three pages is the current page.

Navigation bar 210 comprises areas by which an operator may direct navigation within the stack. By selecting area 212, the "previous" page preceding the current page will become the new current page and a miniature replica 202 of the new current page will be shown. By selecting area 214, the "next" page following the current page will become the new current page and a miniature replica 202 of the new current page will be shown. In either case, the information displayed in area 216 will be updated to show the correct number of the current page.

In one embodiment, an operator may "wrap around" the end of the stack by selecting the "next" page following the last page, or by selecting the "previous" page preceding the first page in the stack. In another embodiment, no wrap around is permitted. In this second embodiment, the lack of a wrap around feature may be indicated by changing the appearance of area 212 or area 214 as appropriate to show that the corresponding function is inactive, and/or by providing an audible alarm that the operator is attempting to move beyond the first or last page of the stack.

In a preferred embodiment, an operator may specify any page in the stack as the new current page by selecting area

216. In response to this selection, the interface prompts the operator to specify the desired page. A "dialog box" is one example of an interface embodiment which prompts for and receives operator specifications. A schematic illustration of dialog box 220 is shown in FIG. 4. Text 221 indicates the number of pages in the stack and the number of the current page. An operator may use a keyboard or other device to enter a page number in area 222 and move directly to that page by selecting "OK" button 224. Alternatively, the first or last page in the stack may be specified by selecting "First page" button 226 or "Last page" button 228, respectively. Alternatively, the request to specify a new page may be cancelled by selecting "Cancel" button 230. After specifying a new page, the dialog box disappears and the representation of the stack is updated to show a miniature replica of the new current page. The dialog box illustrated in the figure should be understood to be only one example of how an operator request may be received.

Numerous variations in the embodiment illustrated in FIG. 3*a* are possible. Navigator bar 210 may contain only one area in which an operator request may be received. For example, the one area may permit an operator to specify only the next page or, alternatively, to specify either the previous or the next page by pressing the left or right button on a mouse, respectively. In addition to all of the above, special keys on a keyboard such as a "home" key and an "end" key may be used to specify the first and last page in the stack, respectively, provided stack representation is highlighted or a cursor overlaps the navigator bar.

FIGS. 3*b* and 3*c* illustrate other embodiments which are variations of the embodiment illustrated in FIG. 3*a*. Referring to FIG. 3*b*, representation 200 comprises miniature replica 202 of the current page and static icon 204 indicating that the object represents a stack. Referring to FIG. 3*c*, representation 200 comprises static icon 204 indicating that the object represents a stack and navigation bar 210 which may be used to control stack navigation. In this embodiment, navigation bar 210 comprises areas 212 and 214 by which the "previous" page and the "next" page may be specified as the new current page, respectively.

FIG. 5 is a schematic illustration of a GUI display similar to the illustration shown in FIG. 2, but incorporating a representation of stack 117 according to various features shown in FIG. 3*a*. By using this representation, (1) the characteristics of stack 117 and overlapped pages 118 are easily distinguishable, (2) the representation is substantially the same regardless of the number of pages in the stack, but the size of the stack is readily ascertained, (3) a navigation bar is provided to easily navigate within the stack, and (4) fewer processing resources are required to display this representation as opposed to the representation shown in FIG. 2. The amount of processing needed to display the representation remains substantially constant for any size stack.

D. System Processes

According to other aspects of the present invention, various system processes may be performed on the current page of a stack in response to an operator request. In the embodiment shown in FIG. 5, a system process may be initiated by selecting an appropriate button on button bar 104 or by selecting an appropriate menu item through menu 102.

Some examples of system processes are: "unstack" which removes the current page from a stack and places the removed page on the desktop; "delete" which removes the current page from the stack and deletes it from the system; and "copy" which extracts information from the current page, generates a corresponding representation for the extracted information, and places the new representation on the desktop. In the embodiment illustrated in FIG. 5, the current page may be removed from a stack and placed upon the desktop by selecting the desired stack and then selecting the button labeled "Unstack1" on button bar 104.

Another system process rotates the current page. In the embodiment illustrated in FIG. 5, the current page of a stack may be rotated by selecting the desired stack and then selecting the button labeled "Rotate" on button bar 104. FIG. 6 is a hypothetical representation of document stack 240 with a rotated image for current page 242. Rotation comprises two aspects. First, the information contents of the page corresponding to the screen image is modified such that a printed representation of the page information is rotated. Second, the screen representation of the page is modified to show that rotation has occurred. Additional details are discussed below.

In a preferred embodiment, representation 244 of the stack is adjusted to reflect the maximum dimensions of the pages within the stack. Referring to FIG. 6, for example, the vertical dimension of the representation is unchanged because other pages in the stack have a height equal to the height of the current page before rotation, but the horizontal dimension of the representation is adjusted according to the width of the miniature replica of the current page after rotation.

Yet another system process allows annotations to be added to and removed from a page. FIG. 7 is a hypothetical representation of an interface for annotations which shows an enlarged view of current page image 312 and provides for three types of annotations. A "transparent note" such as annotation 318 may added by clicking on button 308*a*. The annotation is contained within a transparent rectangular area which may be defined by clicking on image 312 to specify the upper-left corner of the rectangle and using a keyboard to enter desired text. Because of the transparent nature of this rectangular area, underlying features on page image 312 are visible.

A "sticky note" such as annotation 316 may be added by clicking on button 308*b*. The annotation is contained within an opaque rectangular area which may be defined by clicking on the image to specify the upper-left corner of the rectangle and using a keyboard to enter desired text. The opaque character of this rectangular area obscures all underlying features of page image 312.

A "highlight" such as annotation 314 may be added by clicking on button 308*a*. The highlighted rectangular area is defined by clicking on the image to specify one corner of the rectangle and by dragging and dropping a cursor elsewhere on the image to specify the opposite corner of the rectangle. Preferably, the rectangular area is displayed with coloring or shading which contrasts with the color or shade of the page image background.

The enlarged representation of page image 312 illustrates a "page view" of a page image. Any page on the desktop may be viewed more closely by selecting the desired page or the stack containing the current page of interest, and by then clicking on the "Page" button in button bar 104. Conversely, a "desktop view" may be seen by selecting the "Desktop" button in button bar 104.

In an alternate embodiment not shown, three bars are provided in page view which are similar in appearance and in use to the navigation bar described above. A "document bar" allows another stack or individual page on the desktop to be displayed in page view. By clicking on the left-hand or right-hand portion of the document bar, a previous document or a next document on the desktop, respectively, may be selected for view. The concept of document order on the desktop is discussed below. By clicking on the center portion of the document bar, any document on the desktop may be specified. A navigation bar is provided for navigating within a stack containing the page shown in page view. The use of this bar is identical to that described above. If the image shown in page view is an individual page, the navigation bar is inactive. A sizing bar is provided to adjust the size of the image displayed in page view. This is useful for viewing vary large or very small page images. The displayed image may be enlarged, reduced, or set to actual size by clicking on the appropriate portions of the sizing bar. These functions facilitate the viewing and annotating of page images but are not required to practice the present invention.

E. Stack Maintenance
1. Selecting Pages and Stacks

The system processes and navigation facilities described above generally work within the context of one selected stack. In one embodiment, an interface allows an operator to select a stack by clicking on any portion of the corresponding representation, or by defining a rectangular area on the screen which encompasses at least a portion of the representation. In an alternative embodiment, a stack may be selected only if the corresponding representation is completely enclosed by the rectangular area. Either alternative may be implemented in an embodiment incorporating the present invention.

Other system processes such as those described below may also operate with multiple stacks and/or individual pages. In one embodiment, multiple stacks and/or pages may be selected using any one of three methods. The first method invokes a "select All" process which selects all stacks and pages on the desktop.

According to a "rectangle" method, mouse clicks are used to define opposite corners of a rectangular area. All stacks and pages which correspond to representations at least partially included within the rectangular area are selected. Alternatively, for example, only stacks and pages which correspond to representations completely included within the rectangular area are selected.

According to a "multiple-click" method, an operator selects multiple stacks and/or pages by pressing either a "shift" key or a "control" key on a keyboard while using a mouse to click on the desired objects. Alternatively, for example, a right button on a mouse may be pressed to make multiple selections and a left button may be pressed for other operations. In preferred embodiments, a selected page or stack may be unselected by clicking on it again.

In a preferred embodiment, the appearance of each selected stack and page is altered to provide an indication to the operator that the object has been selected. For example, this may be accomplished by changing the color or shade of some portion of the representation.

In addition to the three methods described above, certain system functions implicitly select stacks and/or pages. For example, a "Stack all" process selects all stacks and pages on the desktop and assembles them into one stack.

The concept of order is important for some system processes such as creating a stack, described below. A processing system may establish the order of selected stacks and pages according to the method used to select them. Pages selected using the "select All" or rectangle methods may be ordered according to some priority ranking such as the relative placement of corresponding representations on the desktop. For example, priority may be ranked from left to right, top to bottom. Stacks and pages corresponding to representations nearer the top edge of the screen will be ordered ahead of those corresponding to representations lower on the screen. Within a given horizontal row of representations arranged on the desktop, a stack or page corresponding to a representation to the left of a second representation will be ordered ahead of the stack or page corresponding to that second representation. Stacks and pages selected using the multiple-click method are ordered according to the order in which they are selected. For any of the methods, the order of the pages within a selected stack is preserved.

2. Stack-Oriented Processes

For ease of discussion, the term "selected pages" is used below to refer to both selected individual pages and pages within selected stacks unless the context of the discussion makes it clear that only individual pages are intended.

Selected pages may be assembled into a new stack by invoking a system process for that purpose. In the embodiment illustrated in FIG. 5, such a process is invoked by selecting the button labeled "Stack" on button bar 104. Preferably, the order of the selected pages is preserved in the new stack.

Selected pages may be added to a "target" stack or page by dragging the selected pages until a cursor overlaps the target stack or page and then dropping the selected pages onto the target stack or page.

Any of several features are provided in preferred embodiments: (1) the appearance of the target object is altered while a cursor overlaps it to provide an indication to the operator that the selected pages will be added to the target stack or page if the selected pages are dropped; (2) the order of the selected pages is preserved in the stack resulting from the drag and drop operation; (3) if the selected pages are dropped onto a stack, the selected pages are inserted into the target stack just prior to the current page of that stack; and (4) if the selected pages are dropped onto an individual page, the target page will become the last page in the resulting stack.

Selected stacks may be dissolved into individual pages by invoking a system process for that purpose. In the embodiment illustrated in FIG. 5, such a process is invoked by selecting the button labeled "Unstack" on button bar 104. Preferably, the unstacked pages will be arranged on the desktop in an order corresponding to the order they had within the stack.

Selected stacks may be duplicated by invoking a system process for that purpose. In the embodiment illustrated in FIG. 5, such a process is invoked by selecting the button labeled "Duplicate" on button bar 104. Preferably, an indication such as a name or title associated with the representation of the stacks will distinguish the original stack from the duplicate.

F. Implementation

Efforts to standardize the system-operator interface across a wide range of products have contributed to the familiarity of those skilled in the art with the implementation of products having such interfaces. For example, software conforming to conventions established by products with the trademarks "Windows," "OS/2 Presentation Manager," and "Macintosh Finder" each offer a GUI comprising a desktop with icons and various system processes which provide for selecting a object by clicking on the object and invoking system processes by drag and drop techniques. The use of features such as pull-down menus, button bars, and dialog boxes is commonplace. The implementation of visual effects such as altering the appearance of a selected object or providing a three-dimensional appearance of a depressed button by emulating a shadow when the button is selected are practiced widely in the art. Additional details of implementation compatible with the software products mentioned above may be obtained by referring to: "The Windows Interface: An Application Design Guide" for Microsoft Windows 3.1, 1992, Microsoft Corp.; Petzold, "Programming Windows", 2nd ed., 1990, Microsoft Press and "Inside Macintosh" developer reference manuals, Apple Computer, Inc., all of which are incorporated by reference in their entirety. The details of implementation discussed below utilize features which may be generic to a wide variety of environments; however, these details should be understood to represent one embodiment which is offered only as an example.

1. Operator Interaction

The flowchart in FIG. 8 illustrates the logic flow in an interactive system which can incorporate various aspects of the present invention. This flowchart is only one example of a process which can (1) receive requests from an operator, (2) invoke processing to service the request, and (3) provide feedback to the operator regarding the results of the processing used to service the request. The particular structure of the process used to provide system-operator interaction is not critical to the practice of the present invention. Many desirable features of a commercial embodiment such as context-sensitive help or multi-tasking are not shown.

INIT 20 ensures that various elements are prepared for the following steps. For example, the desktop may be displayed or hardware devices may be initialized.

DISPLAY 22 generates a visual representation for each object according to their status and current position on the desktop. Examples of status are whether an object has been selected and the number of the current page in a stack.

INPUT 24 receives requests from an operator. A variety of techniques may be used to implement this step such as, for example, event or interrupt driven input, input device polling, or routines which halt execution while waiting for a request.

VALID 26 validates the request received from an operator. If the request is valid, QUIT 30 is performed, otherwise ERROR 28 is performed. One example of an invalid request is selecting a "Stack" command to form a new stack but having less than two document objects selected on the desktop.

ERROR 28 provides an appropriate indication of an invalid request. The indication may be an audible tone, a message with or without provision for an operator to obtain additional information, and/or a suggested valid request. ERROR 28 may also provide no indication for one or more errors, allowing the system to act as if the invalid request is ignored.

QUIT 30 inquires whether the operator requested termination. If so, TERM 34 is performed next.

PROCESS 32 identifies the request and invokes the processing needed to service the request.

TERM 34 performs all of the functions needed to terminate the process represented in FIG. 8. This may include, for example, storing unsaved documents to disk, saving the configuration of the desktop, and/or clearing a display screen.

Other structures and implementations may be used without departing from the scope of the present invention. Examples of implementations may be obtained from the various references cited above.

2. Primary Functions

Each of the steps discussed above, or comparable steps in other embodiments, utilize a number of primary functions such as creating and displaying objects such as icons or static page representations, receiving input from an operator, selecting objects for subsequent processing, moving selected objects across the desktop, processing "drag and drop" requests, and providing feedback to an operator by altering the visual appearance of the desktop and/or the objects on the desktop. These primary functions may be implemented in many different ways, and the implementation will generally depend in part upon the environment in which the system is implemented. Several examples of environments mentioned above include those provided by products offered under the trademarks "Windows," "OS/2," "DESQview," "GEOS," or "Macintosh Finder." In preferred embodiments for "Macintosh" computers, implementation of "drag and drop" functions include proprietary techniques of Apple Computer, Inc. as described in the "Macintosh Drag and Drop Developers Kit" which is incorporated by reference in its entirety.

3. Secondary Functions

The step PROCESS 32, or comparable steps in other embodiments, utilize a number of secondary functions to service operator requests. No special significance need be attached to the terms "primary" and "secondary" functions; primary functions pertain more directly to the system-operator interaction and secondary function pertain more directly to internal processes required to service operator requests.

a. Page and Stack Management

In one embodiment, each object on the desktop is associated with a "descriptor" block of information which includes a short name for the object, the type of object, the vertical and horizontal size of the object and its position on the desktop. If the object represents a stack of pages, the descriptor block also includes the total number of pages in the stack, the number of the current page, and a link or pointer to the first page in the stack. Each page in the stack is associated with one another by a double-linked list structure with forward and backward linkages. Such a structure simplifies implementation of various stack management functions such as adding pages to the stack, removing pages from the stack, and navigating within the stack. Other structures are possible and no particular implementation is critical to the practice of the present invention.

In this embodiment, the formation of a stack comprises initializing a descriptor block for the stack and forming the linked list associating all of the pages in the stack. The insertion of one or more pages into the stack comprises modifying the linked list to include links to the newly inserted pages. It should be appreciated that individual pages not in a stack have their own respective descriptor blocks. Whether or not such descriptor blocks are retained with the respective pages after insertion into a stack is a detail of implementation which is not critical to the practice of the present invention.

In this embodiment, the removal of a page from a stack comprises modifying the linked list to exclude the removed page from the list and initializing a descriptor block for the removed page. The process to copy the current page in the stack comprises duplicating the information of the current page and initializing a descriptor block for the duplicate page.

In this embodiment, the dissolution of a stack into individual pages comprises initializing a descriptor block for each page in the stack and discarding the descriptor block and the linked list for the stack.

As discussed above, the process of page rotation comprises two aspects: (1) rotating The page itself and (2) generating a desktop object such as a miniature replica to represent the effects of the rotation. The process used to rotate the page depends upon the nature of the corresponding information and the system process used to generate a printed representation. If the corresponding information is a drawing processed by certain drafting programs, the page may be rotated by imbedding a code in the document specifying the dimensions of the page. For example, the document would be modified to indicate that the page dimensions are 11"×8.5" instead of 8.5"×11".

If the corresponding information is a bit-mapped image of a printed page, the rotation may be accomplished by applying a suitable two-dimensional transformation to the bit-mapped data. Additional information on two-dimensional transformations may be obtained from Foley and Van Dam, "Fundamentals of Interactive Computer Graphics," 1983, Addison-Wesley, which is incorporated by reference in its entirety. An orthogonal rotation, however, may be accomplished by simply exchanging rows and columns of bits in the bit-mapped image.

The second aspect of page rotation pertains to generating a suitable representation to provide feedback to the operator that the page has been rotated. If static icons are used to represent pages, this may be accomplished by selecting an appropriate icon which represents the orientation of the page following rotation. If miniature replicas are used to represent pages, then either the miniature replica may be rotated using a suitable transformation or a new replica may be formed from the rotated page. In preferred embodiments, a new replica is formed. An example of a process used to form replicas is discussed below.

b. Stack Navigation

In the embodiment described above, navigation among pages in a stack may be accomplished by traversing the linked list. A process for responding to an operator request to page forward to the next page comprises following the forward link in the list and incrementing the current page in the stack descriptor block. A process for paging backward comprises following the backward link in the linked list and decrementing the current page in the descriptor block. If a wrap-around feature is provided, attempts to page backward beyond the first page or page forward beyond the last page results in wrapping around to the opposite end of the stack. This feature can be implemented efficiently if the stack descriptor block also contains a link to the last page in the stack. The selection of a particular page in the stack can be accomplished by calculating the difference between the number of the desired page and the number of the current page and traversing the linked list in the appropriate direction for an appropriate number of pages.

Many variations in implementation are possible. No particular embodiment is critical to the practice of the present invention.

c. Annotations

The processes supporting highlights, sticky notes and transparent text may share many common features of implementation. In one embodiment, each annotation includes a "specification block" for specifying the annotation type, the position of the annotation on the associated page representation, the dimensions and the orientation of the annotation. A specification block for sticky notes and transparent text also provides for annotation text.

In this exemplary embodiment, a process for creating an annotation comprises initializing a specification block and receiving size and location information from an operator. As an operator moves and/or resizes an annotation, the contents of the respective specification block are modified to reflect the correct position and/or dimensions of the annotation. As an operator rotates a page, the specification blocks of associated annotations are modified to reflect the new position and/or orientation of the annotation. A text editor is used to manipulate the text for sticky notes and transparent text. The removal of an annotation comprises discarding the respective specification block and releasing any storage used to store text or other information.

d. Miniature Replica

In one embodiment, a miniature replica of a page is formed by obtaining a bit-mapped representation of the page, spatially low-pass filtering the representation and sampling the low-pass filtered result. For example, each pixel in a miniature replica corresponding to a 1:N reduction of a bit-mapped representation can be obtained from the average of N×N areas of bits in the representation. Other forms of two-dimensional low-pass filtering are possible, and many alternative processes known generally as anti-aliasing techniques may be used. A corrective process known generally as gamma correction is applied to obtain a 4-level greyscale replica which more closely resembles the appearance of the corresponding page to the human eye. Additional information on antialiasing and gamma correction can be obtained from Foley, Van Dam, Feiner and Hughes, "Computer Graphics," 2nd ed., 1990, Addison-Wesley, incorporated by reference in its entirety, and from Foley and Van Dam, "Fundamentals of Interactive Computer Graphics" cited above.

In embodiments providing annotations, appropriate icons are included at appropriate locations within a replica to represent the approximate positions of related annotations.

In embodiments with limited memory, a buffer can improve the efficiency of using miniature replicas. In a preferred embodiment, miniature replicas are formed when needed and stored on a storage medium with the corresponding page representation. Preferably, the replicas are stored on a storage medium adjacent to the corresponding page representation to reduce the time required to access the replica and representation. Storage can be used more efficiently by storing the replicas and the page representations in a run-length encoded (RLE) form. Additional information on RLE can be obtained from Foley et al., "Computer Graphics" cited above.

The flowchart in FIG. 9 illustrates one process for using a replica buffer. Many suitable alternative techniques are well known in the art.

BUFFER 42 inquires whether the desired miniature replica is in the replica buffer. If so, step RETURN 58 is performed next; otherwise, the process continues with step FILE 44.

FILE 44 inquires whether the desired replica is stored in a file on disk. If so, the process continues with step LOAD 46, otherwise the process continues with PAGE 48.

LOAD 46 loads the desired replica into the replica buffer from disk storage and decompresses it if it is stored in a compressed form such as RLE. The process continues with step RETURN 58.

PAGE 48 inquires whether the page representation corresponding to the desired replica is in memory. If it is, step FORM 50 is performed next; otherwise, step COMPR 52 is performed next.

FORM 50 forms a miniature replica from the page representation and stores the replica in the replica buffer.

COMPR 52 inquires whether a page representation in compressed form is in memory. If it is, step DECOMPR 54 is performed next; otherwise, step READ 56 is performed next.

DECOMPR 54 decompresses the compressed form of the page representation and then continues with step FORM 50 described above.

READ 56 reads the appropriate page representation in a compressed form from disk storage and continues with step DECOMPR 54.

RETURN 58 establishes the location of the desired replica in the replica buffer for subsequent use and terminates the process illustrated in FIG. 9.

In one embodiment, a least-recently used technique is used to discard miniature replicas from the replica buffer when sufficient unused buffer space is not available to load a desired replica. No particular buffer management technique is critical to the practice of the invention; therefore, other techniques may be used.

What is claimed is:

1. An information processing method comprising:

displaying a plurality of page representations each corresponding to a respective page and a plurality of stack representations each corresponding to a respective plurality of pages, wherein a respective stack representation is visually distinctive from one or more page representations, each of said plurality of stack representations comprising a depiction of a stack of pages and an image corresponding to a current page in said stack, and a request area by which an operator may specify a page in said stack to be a new current page;

receiving one or more operator requests; and rotating said image of said current page in a selected stack representation and modifying a page of information corresponding to said image so as to effect a similar rotation in a printed representation of said page of information, wherein said selected stack representation is selected and said rotating and said modifying are performed in response to said one or more operator requests.

2. A method according to claim 1 wherein said image of a current page is arranged so as to appear on top of said stack of pages.

3. A method according to claim 1 wherein said image corresponding to a current page is a miniature replica of a printed representation of said current page.

4. An information processing method comprising:

displaying a plurality of page representations each corresponding to a respective page and a plurality of stack representations each corresponding to a respective plurality of pages, wherein a respective stack representation is visually distinctive from one or more page representations, each of said plurality of stack representations comprising a static icon depiction of a stack of pages and a miniature replica of a printed representation of a current page in said stack;

receiving one or more operator requests; and rotating said image of said current page in a selected stack representation and modifying a page of information corresponding to said image so as to effect a similar rotation in a printed representation of said page of information, wherein said selected stack representation is selected and said rotating and said modifying are performed in response to said one or more operator requests.

5. A method according to any one of claims 1, 2, 3 or 4 further comprising adjusting said depiction in said selected stack representation such that the horizontal dimension of said depiction corresponds to the maximum horizontal dimension of all pages in said stack and the vertical dimension of said depiction corresponds to the maximum vertical dimension of all pages in said stack.

6. An information processor comprising:

a display, a keyboard and/or a pointing device, and processor means for receiving from said keyboard and/or said pointing device one or more operator requests, for displaying on said display a plurality of page representations each corresponding to a respective page and a plurality of stack representations each corresponding to a respective plurality of pages, wherein a respective stack representation is visually distinctive from one or more page representations, each of said plurality of stack representations comprising a depiction of a stack of pages and an image corresponding to a current page in said stack, and a request area by which an operator may select a page in said stack to be a new current page, and for rotating said image of said current page in a selected stack representation and modifying a page of information corresponding to said image so as to effect a similar rotation in a printed representation of said page of information, wherein said processor means selects said selected stack representation and performs said rotating and said modifying in response to said one or more operator requests.

7. An information processor according to claim 6 wherein said image of a current page is arranged so as to appear on top of a stack of pages.

8. An information processor according to claim 6 wherein said image corresponding to a current page is a miniature replica of a printed representation of said current page.

9. An information processor according to any one of claims 5, 7 or 8 wherein said processor means comprises means for adjusting said depiction in said selected stack representation such that the horizontal dimension of said depiction corresponds to the maximum horizontal dimension of all pages in said stack and the vertical dimension of said depiction corresponds to the maximum vertical dimension of all pages in said stack.

* * * * *